Oct. 23, 1951 D. W. MOLINS 2,572,650
APPARATUS FOR COLLECTING CIGARETTES FROM
CIGARETTE-MAKING MACHINES
Filed June 10, 1946 19 Sheets-Sheet 2

Inventor
D. W. Molins
By Watson, Cole, Grindle & Watson

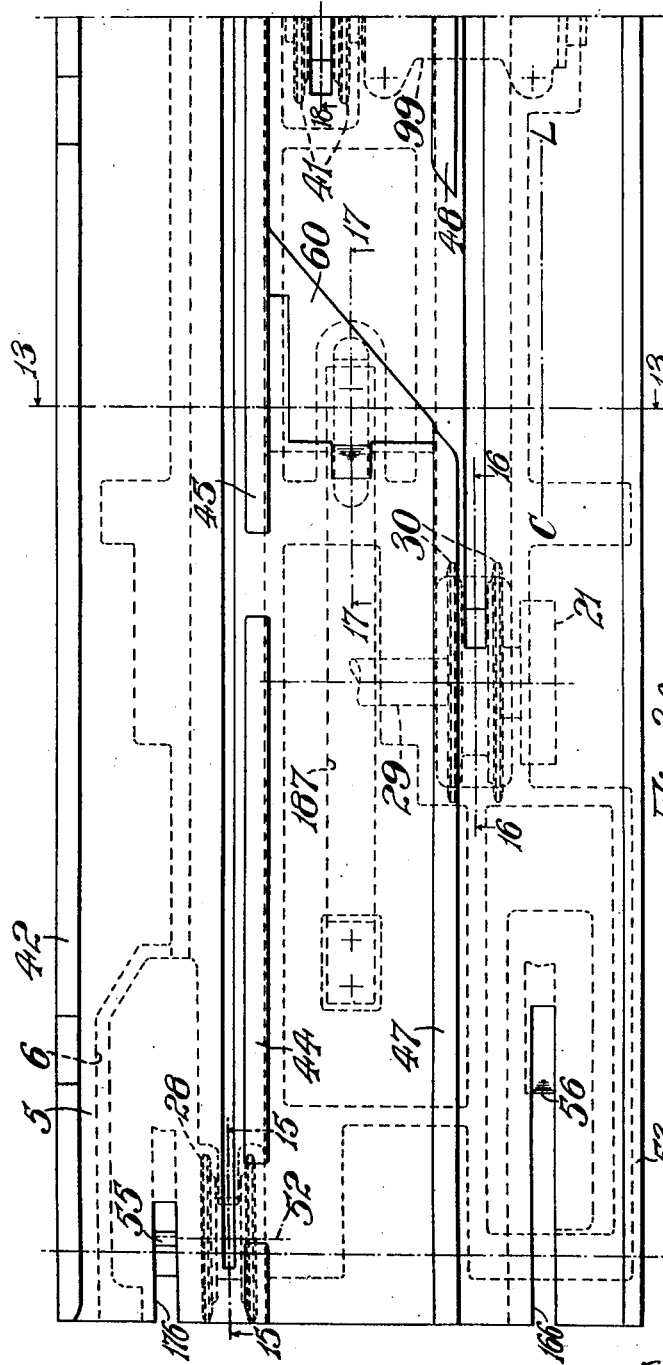

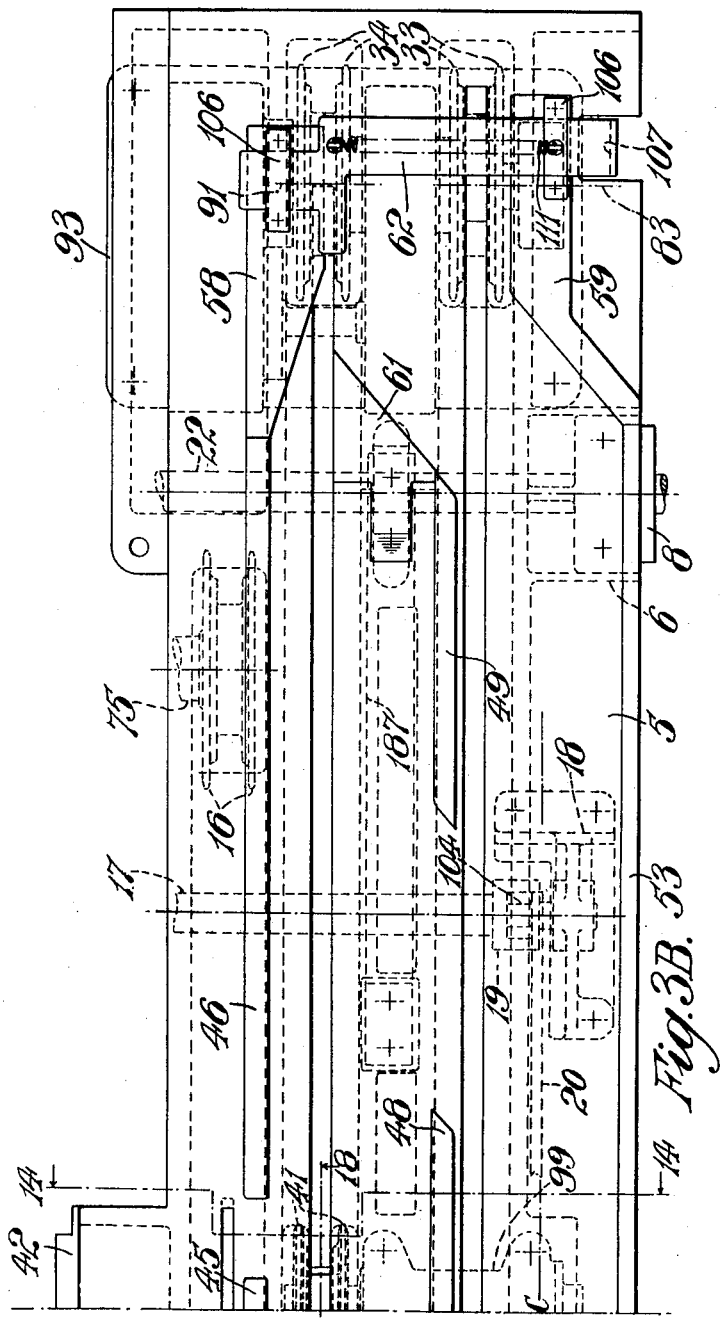

Oct. 23, 1951 D. W. MOLINS 2,572,650
APPARATUS FOR COLLECTING CIGARETTES FROM
CIGARETTE-MAKING MACHINES.
Filed June 10, 1946 19 Sheets-Sheet 5
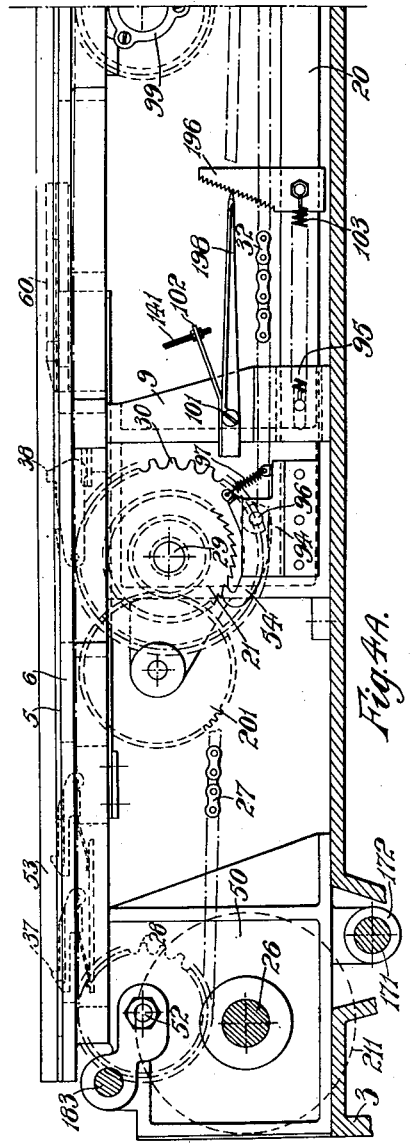
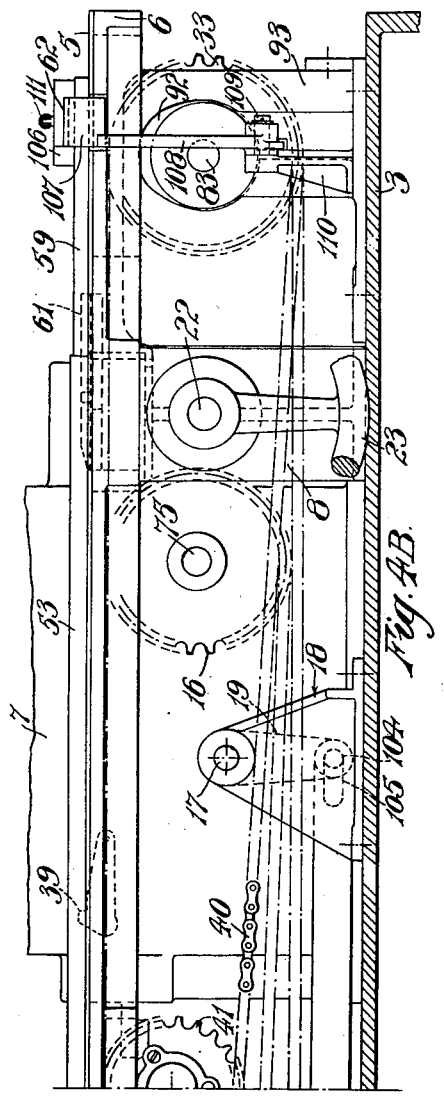
Inventor
D. W. Molins
By Watson, Cole, Grindle & Watson Oct. 23, 1951
D. W. MOLINS
2,572,650
APPARATUS FOR COLLECTING CIGARETTES FROM
CIGARETTE-MAKING MACHINES
Filed June 10, 1946
19 Sheets-Sheet 6
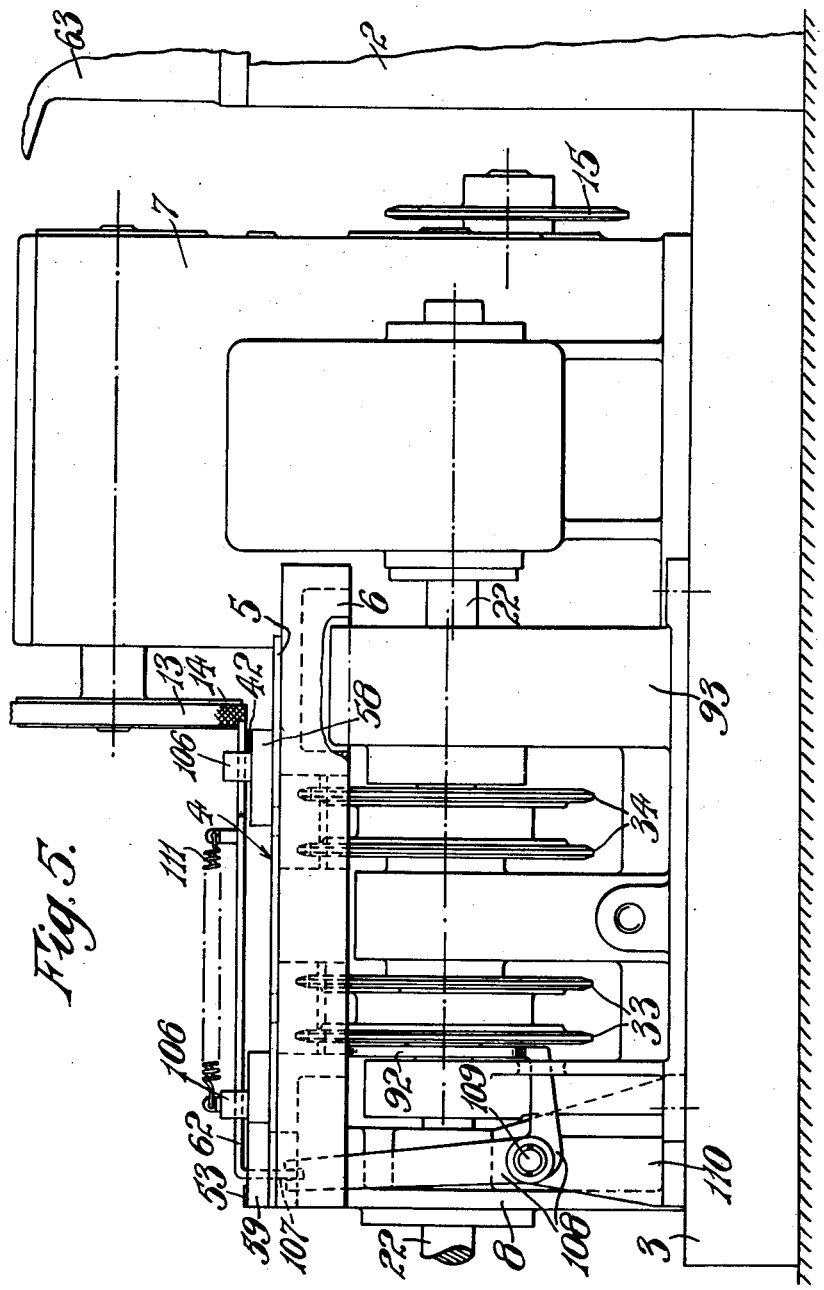
Inventor
D. W. Molins
By Watson, Cole, Grindle + Watson

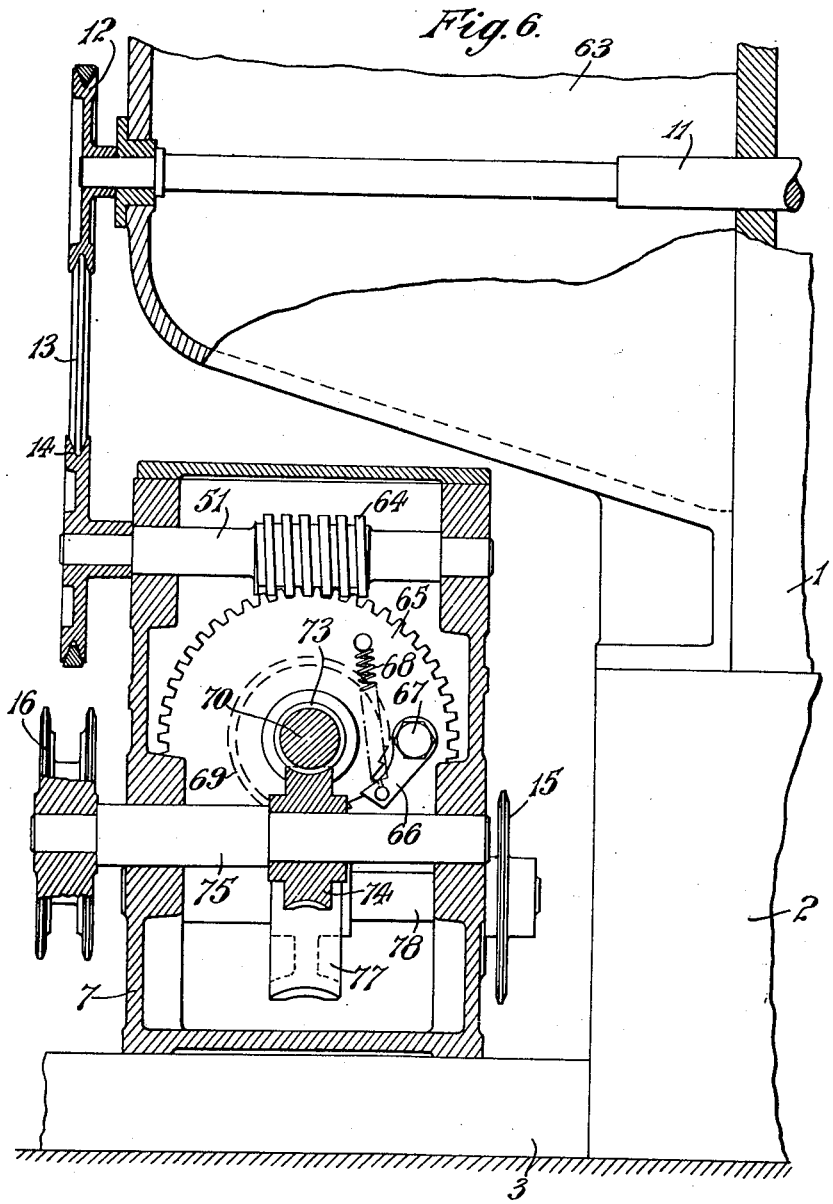

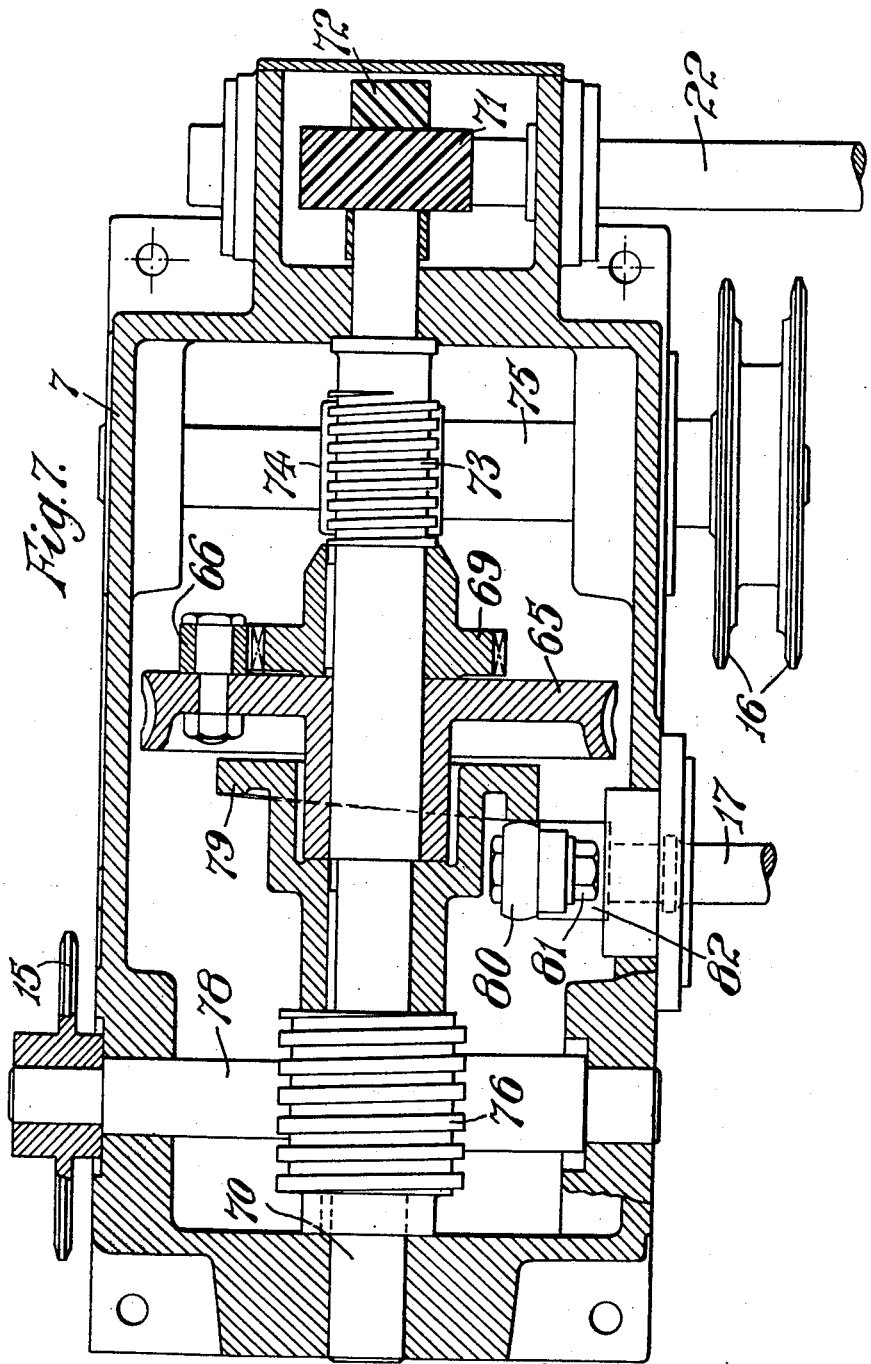

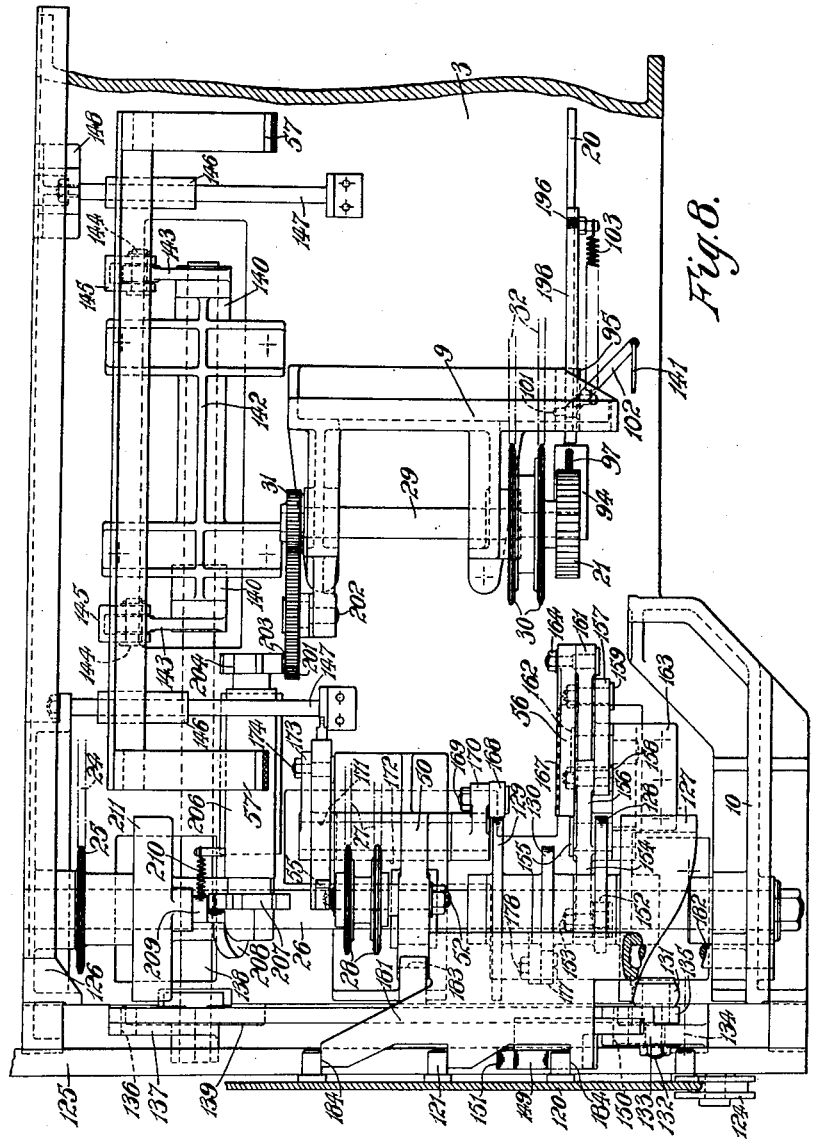

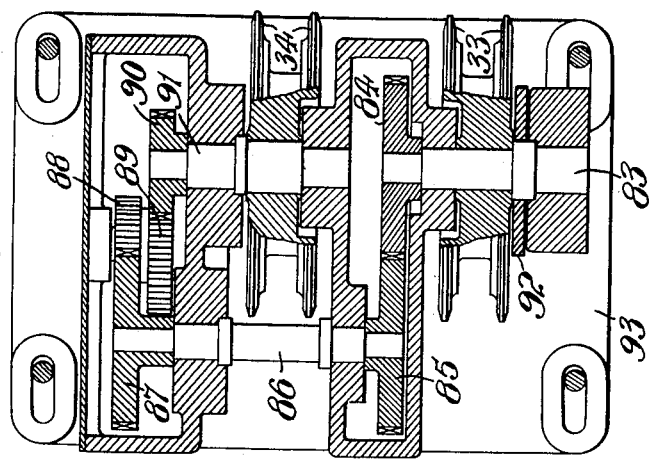
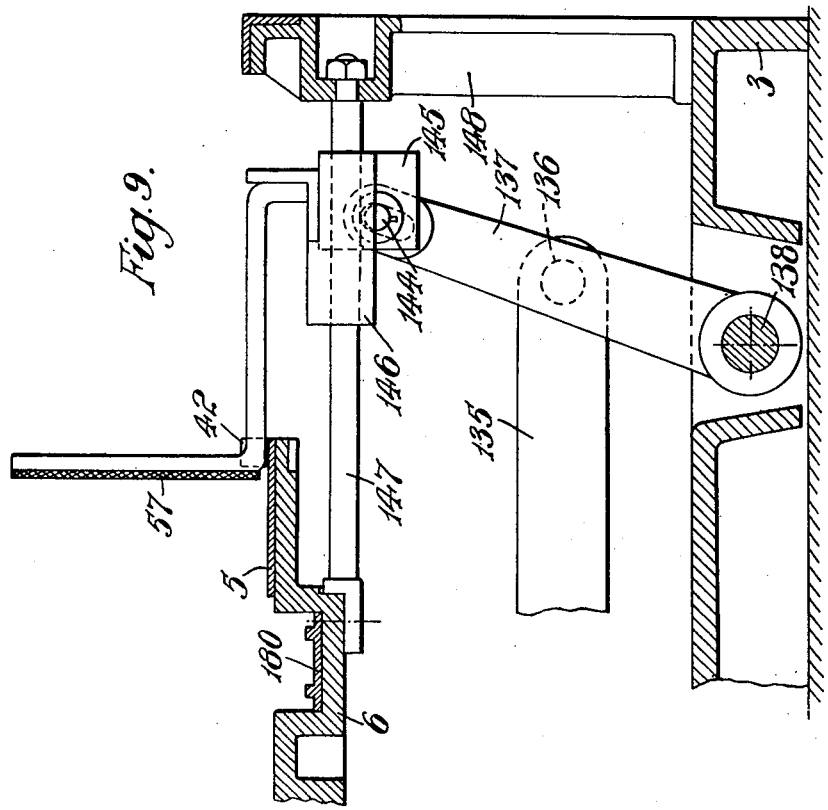

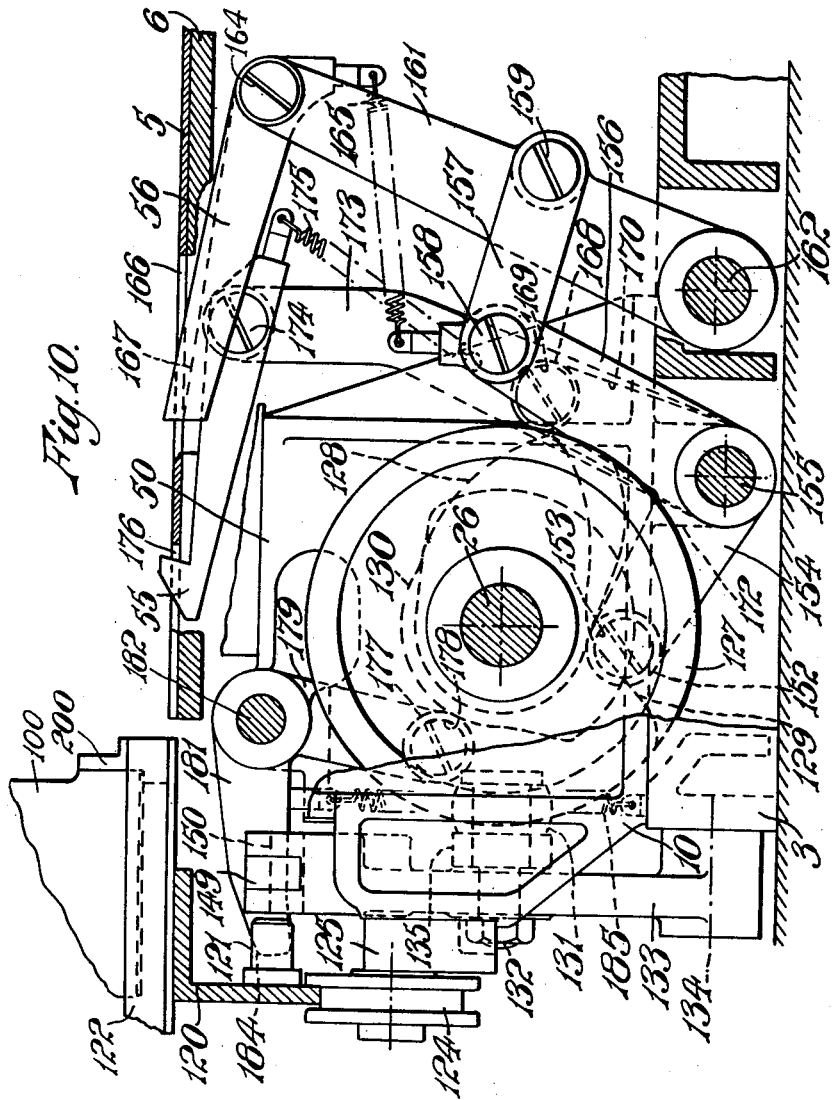

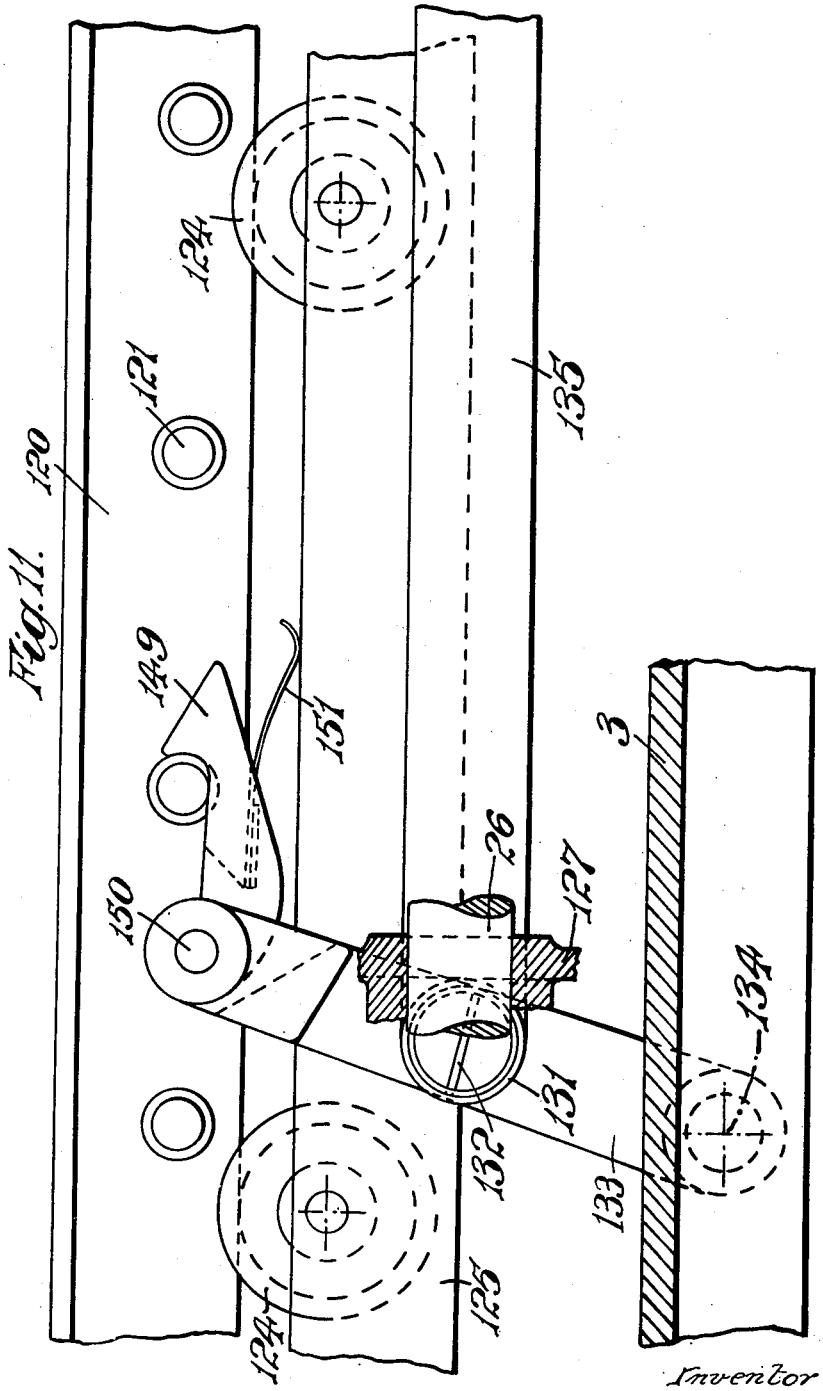

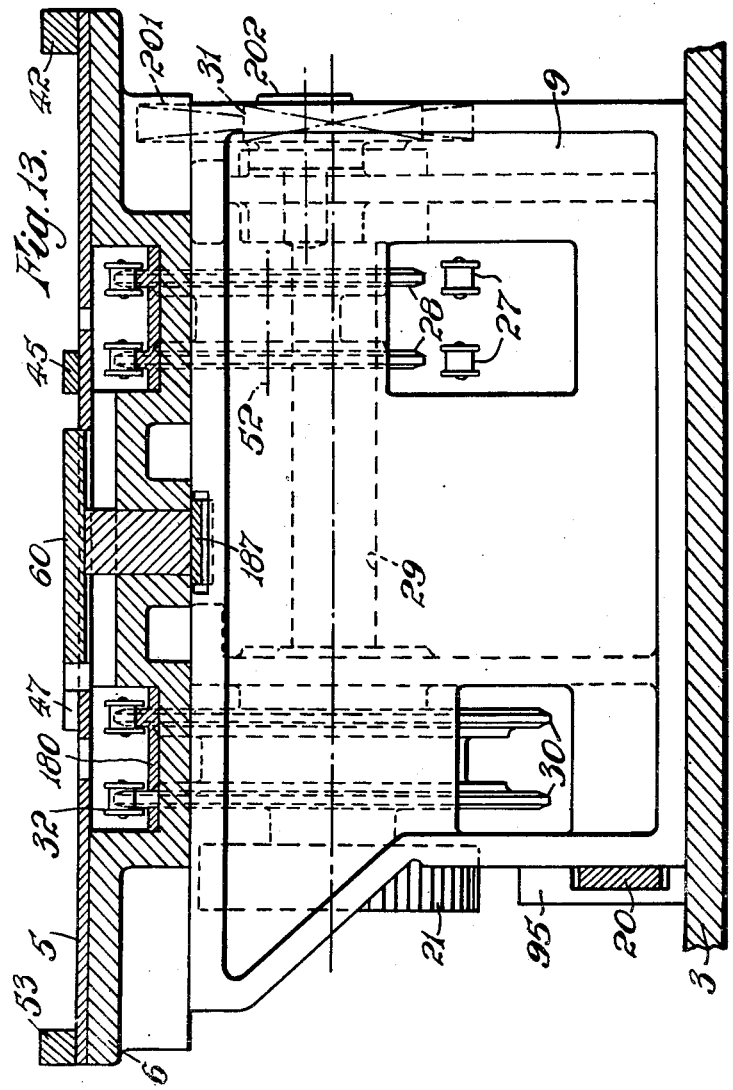

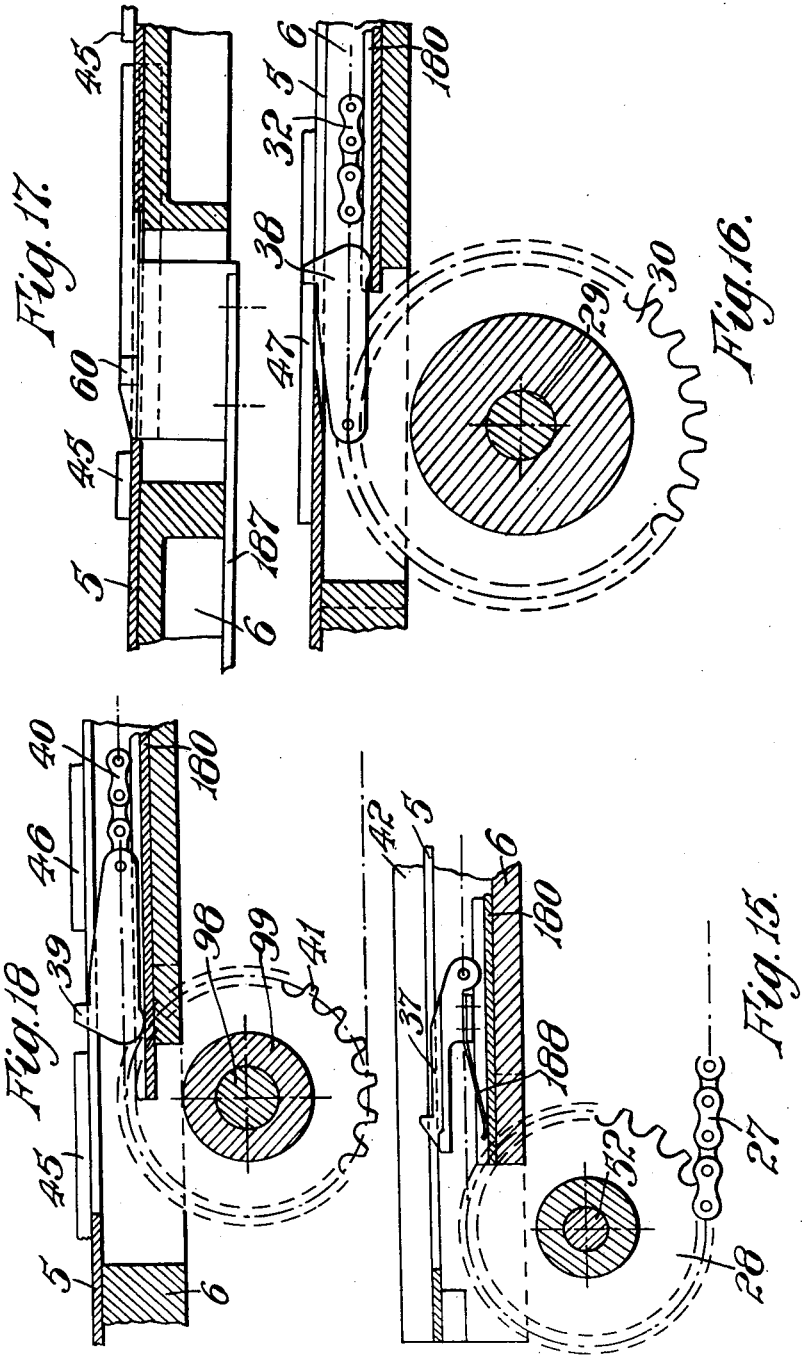

Oct. 23, 1951 D. W. MOLINS 2,572,650
APPARATUS FOR COLLECTING CIGARETTES FROM
CIGARETTE-MAKING MACHINES
Filed June 10, 1946 19 Sheets-Sheet 16
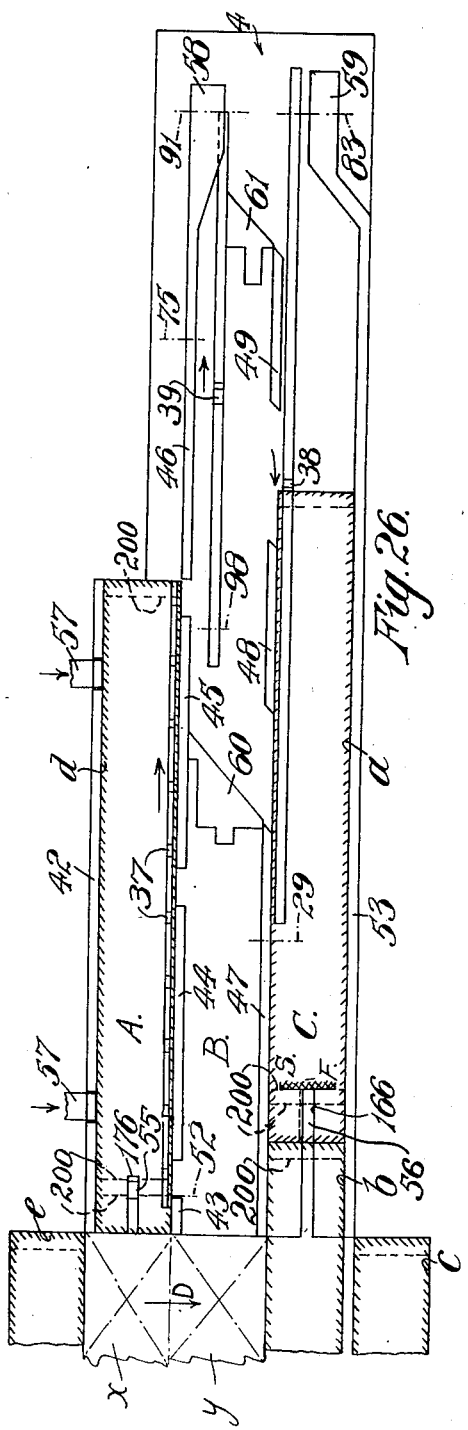
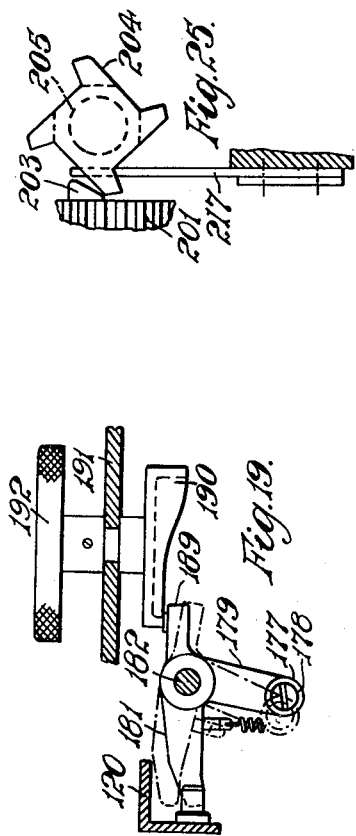
Inventor
D. W. Molins
By Watson, Cole, Grindle
& Watson Oct. 23, 1951 D. W. MOLINS 2,572,650
APPARATUS FOR COLLECTING CIGARETTES FROM
CIGARETTE-MAKING MACHINES
Filed June 10, 1946 19 Sheets-Sheet 17
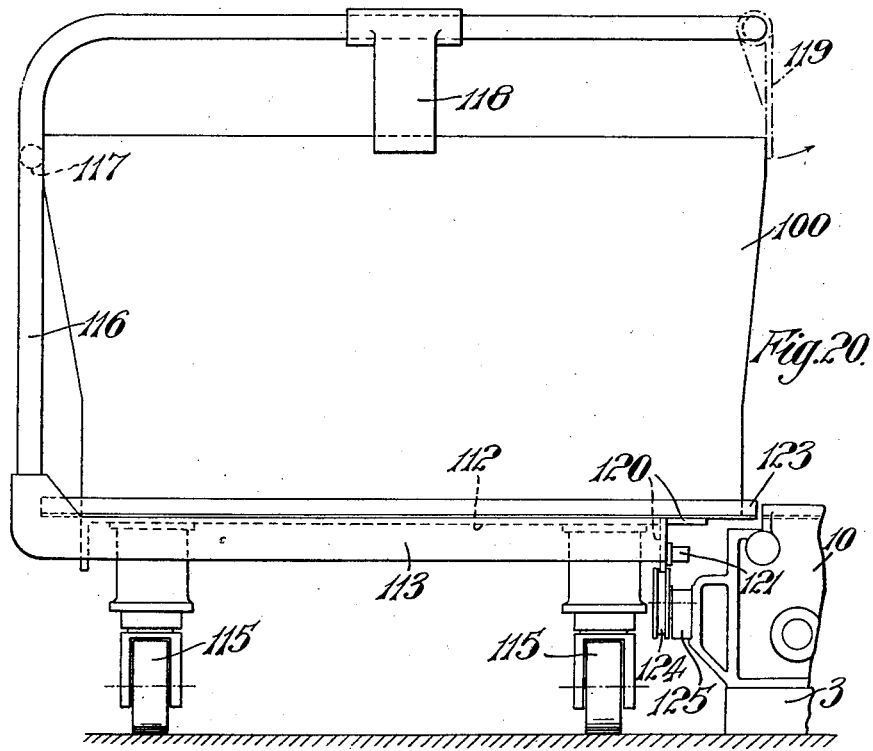
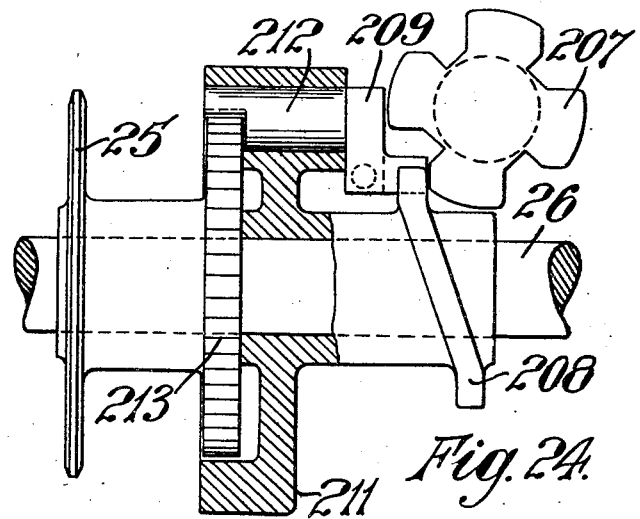
Inventor
D. W. Molins
By Watson, Cole, Grindle &
Watson Oct. 23, 1951 D. W. MOLINS 2,572,650
APPARATUS FOR COLLECTING CIGARETTES FROM
CIGARETTE-MAKING MACHINES
Filed June 10, 1946 19 Sheets-Sheet 18
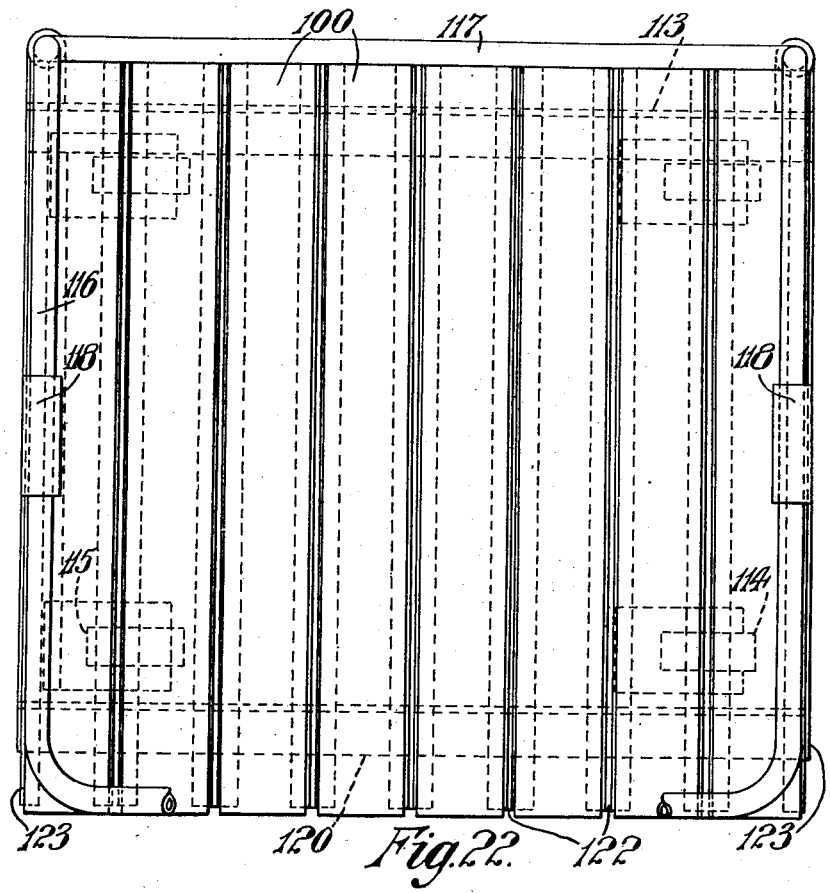
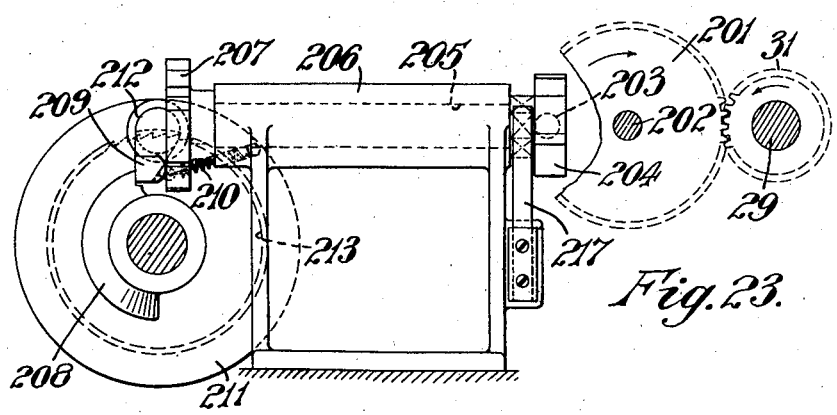

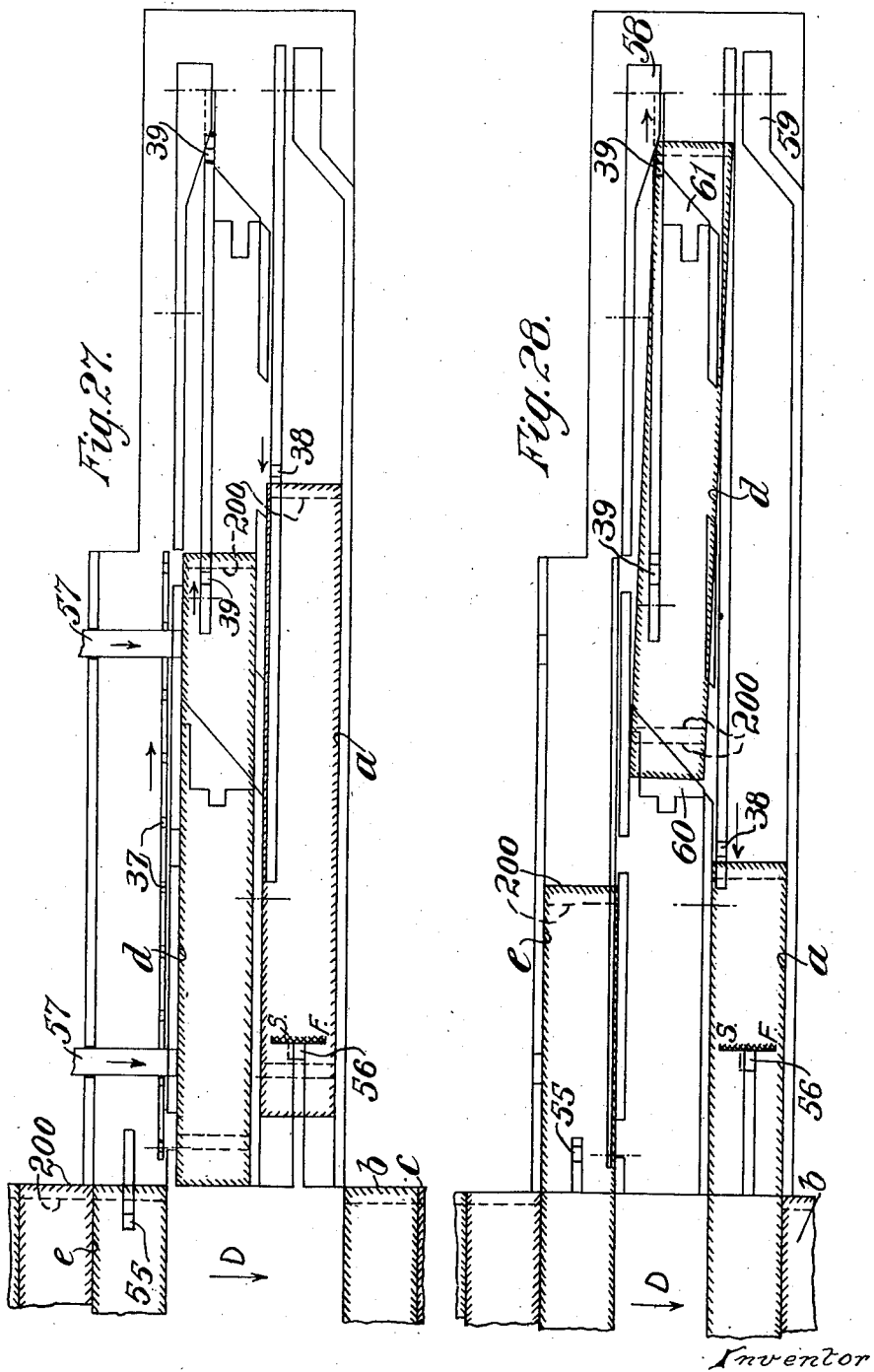

Patented Oct. 23, 1951

2,572,650

UNITED STATES PATENT OFFICE 2,572,650

APPARATUS FOR COLLECTING CIGARETTES FROM CIGARETTE-MAKING MACHINES

Desmond Walter Molins, London, England, assignor to Molins Machine Company Limited, London, England Application June 10, 1946, Serial No. 675,715
In Great Britain March 3, 1945

Section 1, Public Law 690, August 8, 1946
Patent expires March 3, 1965

1 Claim. (Cl. 226—5)

This invention concerns improvements in or relating to the apparatus for collecting cigarettes from cigarette-making machines, and in particular an improved method of, and apparatus for, automatically collecting cigarettes into receptacles as the cigarettes issue from a cigarette making machine. An object of the invention is to provide a high degree of automaticity and continuity in the supply of empty receptacles to receive cigarettes from a cigarette making machine, the collection of cigarettes into such receptacles, and the removal of the receptacles when filled.

According to the present invention there is provided a method of automatically collecting cigarettes into receptacles as the cigarettes issue from a cigarette making machine, wherein empty receptacles are conveyed sideways in succession by conveying means from which they are successively removed lengthwise and subsequently displaced laterally and moved in a reverse direction so as to pass lengthwise in succession past a filling station towards and on to the said conveying means, in such a manner that empty receptacles removed from the said conveying means are subsequently replaced by filled receptacles, said receptacles when filled being moved sideways from the filling station by the said conveying means. The receptacles may be conveyed by conveying means comprising transporter vehicles, which for convenience will be referred to herein and in the appended claims as "trucks."

Further according to the invention there is provided apparatus for carrying out the method referred to above, comprising a truck or a train of trucks arranged to move (e. g. intermittently) past a cigarette machine and adapted to carry receptacles placed side by side thereon, a filling position at which cigarettes are automatically fed into said receptacles, means for automatically removing an empty receptacle from the truck or a truck and subsequently displacing said receptacle into a position from which it can be moved lengthwise past the said filling position, means to move the receptacle automatically lengthwise past the filling position and on to the truck, and control means to control the movement of the truck or trucks. The arrangement may be such that while a filled receptacle is being moved on to a truck an empty receptacle is removed from a truck the truck or train of trucks remaining stationary during said operations and moving on when they are completed. The means to remove receptacles from trucks may comprise an endless chain conveyor having a pawl adapted to engage a part of a receptacle said endless chain conveyor being driven in timed relationship with the movement of the trucks. The floor of the truck or trucks may have a width less than the length of a receptacle. The truck may be provided on three sides thereof with upright guard members or walls so disposed as to maintain in correct position receptacles carried by the truck.

One arrangement made in accordance with the invention will now be described by way of example with reference to the accompanying drawings which show collecting mechanism for collecting cigarettes as they issue from a continuous rod type cigarette making machine.

Figure 1:
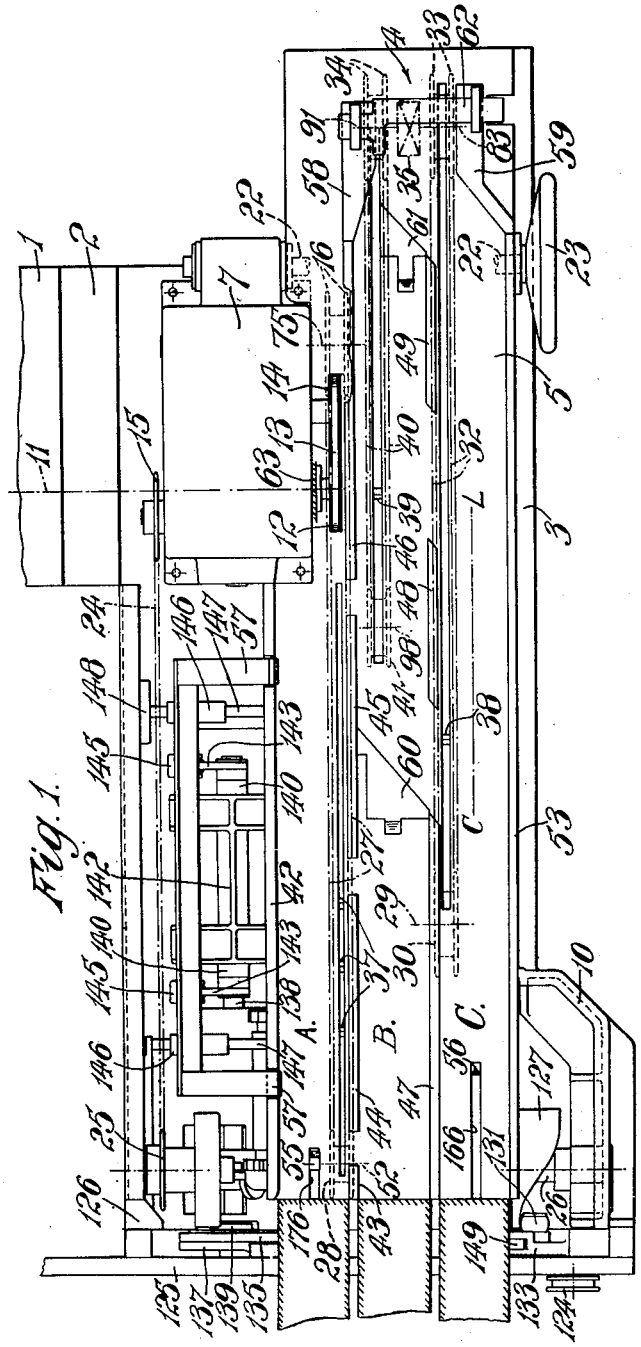
Figure 1 is a small scale plan view of the essential parts of the apparatus shown attached to the delivery end of a continuous rod cigarette making machine.

Figures 3A and 3B together constitute a plan view to a larger scale of a conveyor platform shown in Figure 1.

Figures 4A and 4B together constitute a front elevation of Figures 3A and 3B and also show to a larger scale, and in more detail, parts shown in Figure 1.

Figure 5 is an elevation looking at the right-hand end of Figure 1.

Figure 6 is a sectional end elevation, looking at the right-hand end of Figure 1, and shows driving mechanism and a gear box.

Figure 7 is a sectional plan of the gear box shown in Figure 6.

Figure 8 is a plan view of the left-hand end of Figure 1 the view being taken below the conveyor platform and showing mechanism hidden in Figure 1.

Figure 9 is a fragmentary view looking at the right-hand of Figure 8.

Figure 10 is a front elevation of some of the mechanism shown at the left-hand end of Figure 8, parts being broken away to show inner parts.

Figure 11 is a fragmentary view of some parts of Figure 10, looking from the right-hand of that figure.

Figure 12 is a sectional plan of a gear box shown at the right-hand end of Figure 3B and in elevation in Figures 4B and 5.

Figure 13 is a section on the line 13—13 Figure 3A.

Figure 14:
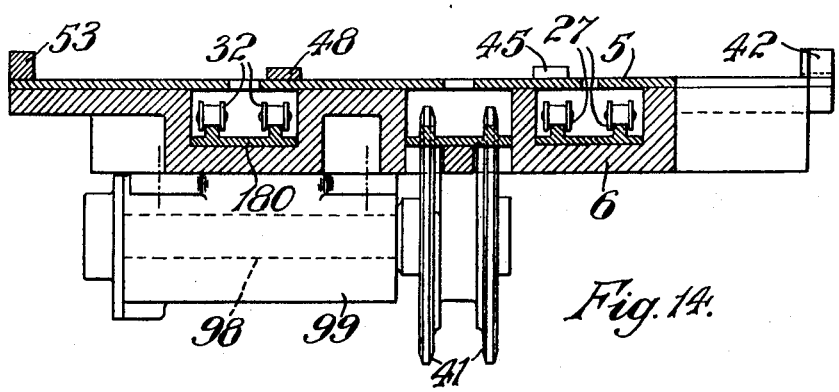

Figure 14 is a section on the line 14—14 Figure 3B.

Figure 15 is a section on the line 15—15 Figure 3A.

Figure 16 is a section on the line 16—16 Figure 3A.

Figure 17 is a section on the line 17—17 Figure 3A.

Figure 18 is a section on the line 18—18 Figures 3A and 3B.

Figure 19 is a diagrammatic elevation of a device for releasing trucks from the apparatus.

Figure 20 is an end elevation of a truck loaded with receptacles and showing its position relatively to the apparatus when operatively coupled thereto.

Figure 21:
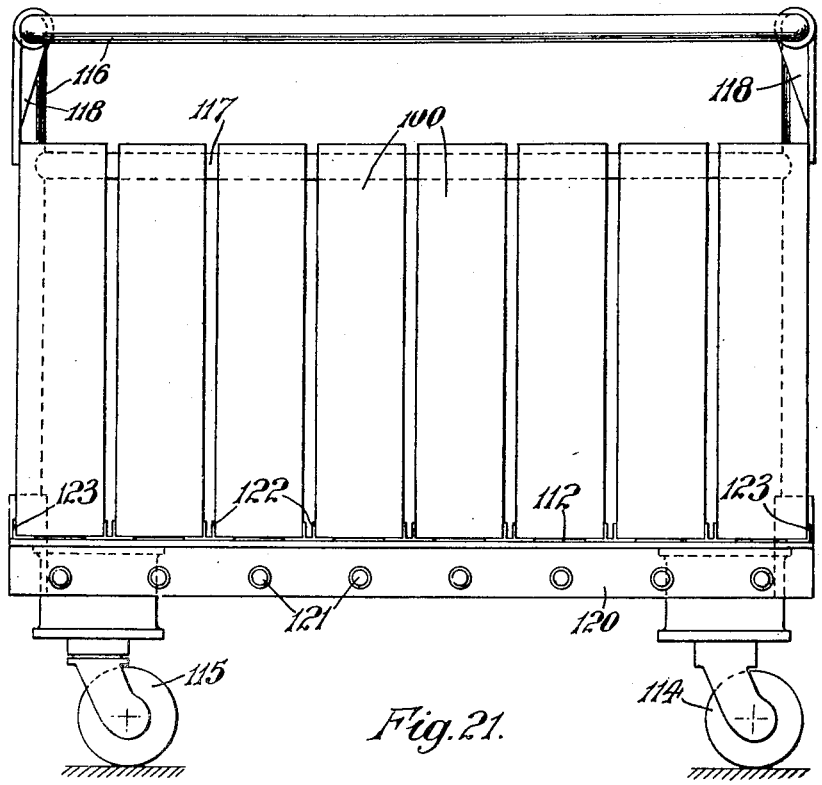

Figure 21 is a side elevation of the truck shown in Figure 20.

Figure 22 is a plan of the truck shown in Figure 20.

Figure 23 is a front elevation of parts of a timing and clutch device shown in plan in Figure 8.

Figure 24 is a fragmentary view looking from the left of Figure 23 and partly in section.

Figure 25 shows a detail of Figure 23.

Figures 26 to 28 are diagrams illustrating the operation of the apparatus.

As the scale of some of the views is necessarily very small, shafts, sprocket wheels, and chains are illustrated in such views by their centre lines only.

Referring first mainly to Figures 1 to 4B, but also to 6, 7 and 8, the bed 1 of the cigarette making machine is supported on a foot 2 and to this there is attached the base plate 3 of the apparatus, which rests on the floor. At some distance above this base plate there is arranged a conveyor platform 4, Figure 1, comprising an upper face consisting of a plate 5 which is suitably attached to a support plate 6. The conveyor platform is supported from the base plate 3 by a number of elements which consist of gear boxes or bearing brackets more fully described later and generally designated in Figures 1 to 4B by the references 7, 8, 9, 10 and 50.

The mainshaft 11 of the cigarette machine is suitably extended and supported in a bracket 63 see also Figure 6, and provided with a pulley 12 which is connected by a belt 13 to another pulley 14 fixed on the end of a shaft 51 supported in the gear box 7, see Figure 6. The interior of this gear box is described later with reference to Figures 6 and 7, and for the present it is sufficient to say that the gearing drives a single sprocket wheel 15, Figure 6, and a twin sprocket wheel 16. A shaft 17 projects from the gear box 7 and receives an oscillatory movement from mechanism inside the box. At its outer end the shaft, which is supported in a bracket 18, Figures 3B and 4B, has a lever 19 fixed thereto. A bar 20 is reciprocated by said lever and operates a ratchet wheel 21 by a pawl 54, further details of this drive being described later.

A further shaft 22 projects from the box and is furnished with a handwheel 23 whereby the mechanism can be manipulated as more fully described later.

A chain 24, Figures 1 and 8, couples the sprocket wheel 15 to another sprocket wheel 25 loosely mounted on a camshaft 26, but normally coupled thereto by a clutch device described later.

The twin sprocket wheel 16 is connected by chains 27 to another twin sprocket wheel 28 loosely mounted on a pin 52 fixed in the bracket 50, the sprocket wheels 16 and 28 running continuously.

On a shaft 29 to which the ratchet wheel 21 is fixed there is also fixed a twin sprocket wheel 30, and at the remote end of the shaft there is fixed a gearwheel 31, Figure 8. This gearwheel is a feature of a timing device for breaking a clutch shown on Figures 8, 23 and 24, and described in detail later.

The twin sprocket wheel 30 is connected by chains 32 to a further twin sprocket wheel 33 at the right hand end of Figure 1 and the two sprocket wheels 30 and 33 move intermittently owing to the ratchet wheel drive outlined above.

Coaxial with the twin sprocket wheel 33 is another twin sprocket wheel 34. These two sprocket wheels are coupled by toothed gearing to give a desired velocity ratio, the gearing being represented in Figure 1 by a cross marked 35 and shown in detail in Figure 12.

The twin sprocket wheel 34 is connected by chains 40 to another twin sprocket wheel 41 which is an idler.

Figure 2:
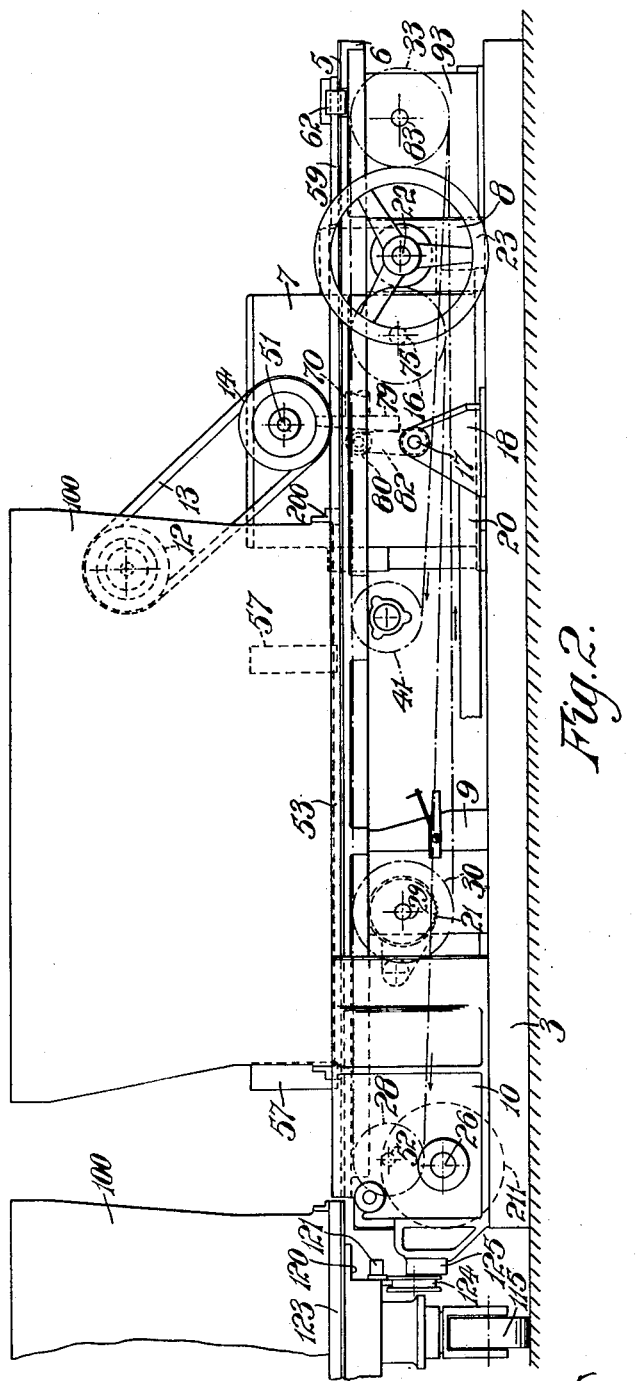
Figure 2 is a front elevation of Figure 1 and also shows a receptacle on the apparatus.

Between the chains of each of the three sets of chains 27, 32 and 40 there are mounted conveyor pieces 37, 38 and 39 respectively which are adapted to engage receptacles such as the one marked 100 in Figure 2 as more particularly described later. The chains 32 have three conveyor pieces, the chains 40 have two conveyor pieces, while the chains 27 have thirty, these being spaced as closely as is practicable. The conveyor pieces move the receptacles along the bed in the manner hereafter decribed when the operation of the apparatus is discussed. In the particular design shown alternate conveyor pieces of the three conveyor pieces of chains 32 engage receptacles but as explained later, the conveyors 32 and 40 are coupled by gearing having a 3:1 ratio.

From Figure 1 it will be seen that a number of guide rails 42, 43, 44, 45, 46, 47, 48, 49 and 53 divide the top plate 5 of the conveyor platform into three conveyor paths, or tracks, which for convenience of reference are marked A, B and C on Figure 1.

Other important details of Figure 1 which may be noted before a more detailed description of the parts of the apparatus is given are a reciprocating hook 55, and a reciprocating pusher 56 which aid in transferring receptacles to and from the platform 4, lateral pushers 57 which assist in moving a receptacle transversely of the platform from track to track, two fixed ramps 58 and 59 which assist in the direction of a receptacle from one track to another and two movable ramps 60 and 61 for the same purpose. A cam operated push-plate 62 also assists in the lateral movement of receptacles as described in detail later. At the left-hand end of Figure 1 there are shown three hatched (broken) rectangles. These are intended to represent receptacles in alignment with the conveyor tracks A, B and C and are inserted to show the relationship between the width of the receptacles and tracks. In use there is never a receptacle opposite to track B as will be understood when the operation is described. The track C has a chain line marked C—L on it. This represents the position of the centre line of the catcher band of the cigarette making machine as projected down on to the conveyor platform.

Referring now particularly to Figures 6 and 7, the shaft 51 is provided with a worm 64 which engages a wormwheel 65. On this wormwheel is mounted a pawl 66 pivoted at 67 and urged by a spring 68 into engagement with a ratchet wheel 69. The ratchet wheel 69 is splined to a longitudinal shaft 70, Figure 7, and at the right-hand end of this shaft, in the figure, there is fixed a spiral gearwheel 71. Another spiral gearwheel 72 mates with the gearwheel 71 and to the gearwheel 72 there is fixed the handwheel shaft 22. On the shaft 70 there is provided a worm 73 which mates with a wormwheel 74 which is fixed on a cross shaft 75 on which the twin sprocket wheel 16 is fixed. At the left-hand end of the shaft 70, Figure 7, there is provided a further worm 76 which engages with a wormwheel 77, concealed beneath the worm in Figure 7, but visible in Figure 6, and mounted on a cross shaft 78. At one end of the cross shaft 78 is fixed the single sprocket wheel 15. As the mainshaft of the cigarette machine rotates, the mechanism shown in Figure 1 will be driven through the gear box 7. When the cigarette machine stops it would in the ordinary way be impossible to move any of the gear box mechanism manually as the load is too great. By providing the ratchet wheel 69 and pawl 66 it is possible to rotate the shaft 70 in one direction by the handwheel 23 as the pawl and ratchet constitute a clutch which only engages when the drive is from the cigarette machine.

To the left of the wormwheel 65, Figure 7, there is splined to the shaft a crown cam 79 which engages a roller 80. The roller is pivoted at 81 to one end of a lever 82, see also Figure 2, said lever being fixed on the end of the rocking shaft 17. Thus as the cam 79 rotates, the bar 20 is moved to and fro and the twin sprocket wheel 30 is intermittently rotated by the ratchet wheel 21.

Referring to Figure 12, the twin sprocket wheel 33 is fixed on a spindle 83 to the other end of which is fixed a gearwheel 84. This engages with another gearwheel 85 fixed on one end of a countershaft 86 to the other end of which is fixed a further gearwheel 87. This wheel engages a small gear-wheel 88 fixed to a larger gearwheel 89 the latter engaging a small gearwheel 90 fixed on a spindle 91 on which the twin sprocket wheel 34 is also fixed. The compound gearing described causes the twin sprocket wheel 34 to be driven by the twin sprocket wheel 33 at a ratio 3:1.

A cam 92 which is shown fixed to the sprocket wheel 33 is the cam which operates the push-plate 62. The whole mechanism shown is supported in or on a gear box 93.

The cam 92 is also shown in Figure 5 from which view the operating mechanism for the push-plate 62 is best understood. The plate is guided by two guides 106 fixed to the ramps 58 and 59 and has a bent down end 107 which is located in a slot at the end of a cam lever 108, pivoted at 109 on a bracket 110 fixed to the gear box 93. A spring 111 is provided and thus as the cam 92 rotates, the push-plate is moved to and fro in its guides.

The supply of cigarettes and the guiding of the cigarettes into the moving receptacles is carried out as fully described and illustrated in United States patent specification No. 2,354,040, and need not be repeated here. The receptacles are substantially the same as in said specification and speed control is effected in the same manner, a rod 141 (shown broken) in Figures 4A and 8 corresponding exactly to the rod 41 in the specification referred to.

Referring to Figures 4A and 8, the bar 20 has a block 94 fixed to its free end and is guided by a guide 95 fixed to the side of the bracket 9. The pawl 54 is pivoted in the block at 96 and urged by a spring 97 into engagement with the ratchet wheel 21. A serrated block 196 is fixed to the bar 20 and engaged by a knife-edged plate 198, pivoted at 101 to the bracket 9 and constituting an adjustable abutment, the parts 196 and 198 corresponding to parts 96 and 98 in the specification referred to. The abutment 198 is moved on its pivot by the rod 141 which is connected to the abutment 198 by an arm 102. This movement determines the stroke of the pawl 54, as the bar 20 is pulled to the left as far as the adjustable abutment will permit by a spring 103 so that the length of the operative stroke of the bar depends on the position of a pin 104, mounted on the end of the lever 19, in a slot 105 in the bar.

The movements of the ratchet wheel 21 and the twin sprocket wheel 30 and thus the movement of the conveyor chains 32 and 40 are all intermittent and the speed thereof is determined by the quantity of cigarettes available at any given time as set forth in the specification referred to.

Before further description of the mechanism is given, the truck shown in Figures 20, 21 and 22 will be described, as in the operation of the apparatus the truck is engaged by and moved by, some of the mechanism.

Referring to said figures, the truck is of such size as to accommodate receptacles crosswise with the receptacles overhanging at one side. The receptacles 100 are shown in Figures 21 and 22 as simple rectangles but a complete description of a substantially similar receptacle is given in United States patent specification No. 2,351,867, while they are illustrated in sufficient detail in United States patent specification No 2,354,040.

The truck comprises a base 112 mounted on an angle-iron frame 113 the whole being supported by a pair of wheels 114 whose axis is fixed relatively to the truck and a pair of caster wheels 115. A tubular framework 116 extends upwards from the base and has a cross tube 117 which forms a stop for aligning the receptacles at one side, see Figure 20. End plates 118 form stops to check movement of the receptacles during transport about a factory and if desired similar plates may depend from a top tube added to the framework so that every receptacle is prevented from undue movement. Side plates 119 shown in chain lines in Figure 20 may be provided to check endwise movement of the receptacles during transport, such plates being movable in the direction of the arrows and provided with latches for holding them in an inoperative position. One part of the base frame consists of an angle-iron marked 120 and this is provided with a number of studs 121 evenly spaced along the length of the angle, the two end studs, Figure 21, each being half a pitch from the neighbouring end of the angle-iron.

The base 112 is provided with a number of guides 122 of angular cross-section, the receptacles being located and guided by these members as shown in Figure 21. The end guides 123 are half the width of the others and so spaced from the neighbouring ends of the angle-irons that the two end guides jointly cover the same space as one of the guides 122. It will be seen that a train of such trucks may be assembled in which the receptacles are pitched apart by exactly the same distance.

In Figure 20 a few parts of the apparatus are also shown, in particular a guide wheel 124 and a bar 125 to which a number of such wheels are attached, see Figure 11. The angle-iron 120 is adapted to be located in the groove of these wheels so that a truck may be guided when moved along the side of the apparatus. Moreover the bar 125 is flat and straight and of such height that the inner wheels of a truck are very slightly above the floor level so that inequalities of the floor level do not affect the satisfactory movement of the trucks.

Referring now to Figures 8, 9, 10 and 11, the camshaft 26 previously mentioned is rotatably supported in the brackets 10 and 50 and in a third bracket 126 best seen in Figure 8. It is rotated as previously mentioned by the sprocket wheel 25 which is driven from the gear box 7 by the chain 24. Four cams are fixed to the camshaft, comprising as best seen in Figures 8 and 10 a crown cam 127, a disc cam 128 for operating the reciprocating pusher 56, a disc cam 129 for operating the reciprocating hook 55 and a disc cam 130 for operating a truck stop device 181 whose more detailed description is deferred.

The crown cam 127 is engaged by a roller 131 pivoted at 132 to a lever 133 which is itself pivoted at 134 to the base plate 3. A link 135 also pivoted to the lever at 132 extends across the apparatus and at its other end is pivoted at 136 to a lever 137. This lever is fixed to a rocking shaft 138 journalled in bearings 139 and 140 attached to the base plate, the bearings 140 being formed in a bridge structure 142, Figure 8. The rocking shaft has levers 143 fixed thereto whose upper ends are slotted, pins 144 working in the slots being pivoted in forks 145. The lateral pushers 57 are fixed to the forks 145, the arrangement being easily followed from Figures 8 and 9. The pushers are guded by bushes 146 which slide on rods 147 extending from the cam shaft bearing bracket 126 and another bracket 148, towards the middle of the apparatus where they are fixed to the conveyor support plate 6, see Figure 9.

The lever 133 extends upwards beyond the pivot 132 and is forked at its upper end where a pawl 149 is pivoted at 150. This pawl whose shape is best seen in Figure 11 is for feeding the truck along the guide bar 125. The pawl is provided with a spring 151, Figure 11, which presses on the guide rail 125.

The pusher cam 128 engages a roller 152 which is pivoted at 153 on one arm 154 of a bell crank lever which is pivoted on a pivot screw 155. The other arm 156 of the bell crank lever has a link 157 pivoted thereto at 158 the link being also pivoted at 159 to a lever 161. The lever 161 is pivoted on a screw 162 fixed to an angle bracket 163 secured to the base 3. On the upper end of the lever there is pivoted at 164 the reciprocating pusher 56 and a spring 165 tends to swing the pusher clockwise on its pivot. The end of the pusher projects above the plate 5 and moves to and fro in a slot 166 in said plate, a recess 167 in the pusher preventing it from rising too far above the plate 5.

The hook cam 129 engages a roller 168 pivoted at 169 on a lever 170 which is fixed to a shaft 171 (see Figure 8) which is coaxial with the pivot screw 155 and journalled in a lug 172 extending down into the base 3 from the bracket 50. At the other end of the shaft is fixed a lever 173 (the hook lever) to the upper end of which there is pivoted at 174 the hook 55. A spring 175 tends to swing the hook clockwise about its pivot but the movement is checked by engagement with the underside of the plate 5 in which there is formed a slot 176 along which the hook moves.

The truck stop cam 130 engages a roller 177 pivoted at 178 on an arm 179 which extends downwards from the truck stop member 181. The latter is pivoted at 182 in the bracket 10 and at 183 in the bracket 50 and comprises several abutments 184 see Figure 8, which engage the studs 121 of the truck. A spring 185 bends to pull the truck stop downwards into the engaging position while it is raised periodically by the cam 130 to clear the abutments from the path of the studs and allow the truck to move under the pull of the pawl 149.

As will appear more clearly later when the operation of the apparatus is being described the camshaft 26 is started and stopped at intervals and the timing and clutch devices shown in Figures 8, 23, 24 and 25 constitute a means for regulating the operation of the camshaft with respect to the movements of the conveyor chains 32 which although intermittently moving are in operation all the time the cigarette machine is running since the ratchet wheel 21 is driven directly from the gear box 7. The gearwheel 31 on the shaft 29 engages a larger gearwheel 201 which is rotatable on a stud 202 the ratio being 1:2. On the wheel 201 is a pin 203 as shown best in Figure 8 for in Figure 23 the wheel 201 is broken away to expose hidden parts. A four-toothed wheel 204 shaped as shown in Figure 25 is fixed on a spindle 205 rotatably mounted in a bearing bracket 206. The hub of the wheel 204 is octagonal in cross section and a flat spring 217 presses on the flats of the octagon and acts as a detent. The other end of the spindle 205 has another four-toothed wheel 207 on it. The shape of this wheel is clear from Figure 24 and it functions after the manner of a wormwheel when engaged by a cam 208 of more or less spiral form. The cam 208 is fixed to the cam shaft 26 and as shown in Figure 24 one end of the cam comprises an abutment or flat adapted to engage a pawl lever 209 for a purpose described later. The pawl lever has a shank 212 of cylindrical shape, journalled in a hole in a drum 211 integral with the cam 208. The end of the shank 212 remote from the lever 209 is cut away to leave a lune shaped piece which constitutes a pawl capable of engaging with a ratchet wheel 213. The ratchet wheel is integral with the sprocket wheel 25 and thus when the pawl is in engagement with the ratchet wheel the camshaft is rotated by the chain 24. The operations of clutching and declutching will be described in the following paragraphs.

Referring now to Figures 26 to 28 which show diagrams of the platform 4 with hatched rectangles indicating various positions of receptacles at different times, the apparatus works in the following manner:

In Figure 26 a receptacle marked $a$ is passing slowly to the left, along track C, beneath the filling station indicated by the reference FS. The receptacle is pushing another marked $b$ on to the truck for at this time the receptacle $b$ has moved out of engagement with a conveyor piece 38 of the conveyor 32 while the receptacle $a$ is being moved along by the succeeding conveyor piece 38 of such conveyor. A filled receptacle $c$ is shown just below the receptacle $b$ this having been filled and returned on to the truck as the result of previous operation of the apparatus.

Track B is empty for the moment while another empty receptacle $d$ has been moved entirely on to the track A. Two spaces indicated by chain lines and marked x and y are shown on the truck opposite tracks A and B and above them is shown another empty receptacle marked e.

At the instant represented in Figure 26 the pusher 56 is about to engage receptacle b and push it quickly off the platform 4 to its final position on the truck. This movement is effected from the camshaft 26 by the mechanism previously described with reference to Figure 10 and it is the first camshaft operation to take place after the ratchet wheel 213 is engaged by the pawl on the arm 209, this clutching operation being described below.

The camshaft makes one revolution between clutching and declutching and the time taken is the same as that required to give six strokes of the pawl 54 which drives the ratchet wheel 21 and the conveyors 32 and 40. While the first pawl stroke is made the pusher 56 shifts the receptacle b from the platform 4 on to the truck. During the time taken for the next four strokes of the pawl 54 the truck is fed forwards in the direction of the arrow D, one stage, that is the distance between two neighbouring studs 121 on the truck angle iron 120. This movement is effected by the pawl 149 described with reference to Figures 10 and 11 and the truck is controlled for exact movement by the member 181. Simultaneously the pushers 57 move receptacle d from track A to track B, the lugs 200 see Figures 2 and 10 of the receptacle passing through the spaces between the rails 43, 44, 45 and 46.

The position of the receptacles at the end of the truck feeding stroke is shown in Figure 27 and instantly the receptacles arrive at the positions shown, the hook 55 pulls another receptacle e off the truck in a time equal to that taken for one more stroke of the pawl 54, making six such strokes in all.

At the end of the sixth stroke the clutch shown in Figure 24 breaks and the camshaft 26 stays still until the clutch is engaged once more, these operations being effected as follows:

Referring to Figures 23, 24, 25 and also to Figure 8, the gearwheel 31 makes two revolutions for the passage of a conveyor piece 38 past a given point and as the gearwheel 201 is twice the size of 31 the pin 203 revolves one revolution per conveyor piece 38. At each revolution the pin 203 strikes a tooth of the wheel 204 and moves the wheel through 45° whereupon it is checked by the spring 217. The other wheel 207 is of course correspondingly moved. When this wheel 207 is in the angular position shown in Figure 24 the arm 209 is free to move on its pivot 212 in the drum 211 under the influence of the spring 210. Thus the pawl will engage the ratchet wheel 213 and the sprocket wheel 25 will therefore drive the drum 211 together with the pawl arm 209 and the cam 208. This cam in passing through the tooth space in the wheel 207 causes the wheel to rotate through 45° and naturally the wheel 204 does the same. This movement of the wheel 207 brings one of the teeth into line with the rotary path of the end of the lever 209 so that as soon as the camshaft 26 has made one revolution the arm 209 engages the face of the wheel 207 which causes said arm to move on its pivot 212 against the action of the spring 210 and the pawl is thus pulled out of engagement with the teeth of the ratchet wheel 213 and the clutch is broken. The previously mentioned flat on the end of the cam 208 then comes into contact with the rear of the pawl as the camshaft continues to move by its momentum and the camshaft is thereby stopped in the proper position, that is as shown in Figure 23. The 45° movement of the wheel 204 derived from the movement of the wheel 207 completes a 90° movement of 204 so the next tooth is ready to be struck by the pin 203. In Figure 25 the wheel 204 is shown in the position corresponding to declutching (i. e. camshaft 26 is stopped) while the wheel 207 is shown in Figure 24 in the position corresponding to clutch engagement, when the camshaft 26 is driven. As already explained, the shaft 29 is intermittently driven and at a variable speed depending entirely on the rate at which cigarettes are delivered by the cigarette machine. In practice, the speed of 29 is anything from zero up to a maximum where a tray is moving past the filling position just fast enough to collect the cigarettes when the cigarette machine is delivering its full output. The sprocket wheel 25 goes at six times the speed of shaft 29 when the latter is at its fastest and therefore the sprocket wheel 25 goes at three times the speed of gear wheel 201. Thus under these conditions the camshaft makes one revolution and is idle for twice the time taken by said revolution. If however the speed of the shaft 29 is lower than its maximum, the idle time of the clutch shaft will be much greater as the time taken for one revolution of the shaft is constant. After an appropriate period the pin 203 strikes the next tooth of the wheel 204 and the clutch is engaged for a further revolution of the camshaft.

Immediately the receptacle e has been pulled on to the platform it is engaged by one of the conveyor pieces 37 on the conveyor 27 as there are a large number of these and in time the receptacle is fed into the position previously occupied by the receptacle d Figure 26. It will be seen from Figure 15 that the conveyor pieces 37 are provided with springs 188 which ride on the conveyor track 180. These springs enable the conveyor pieces to pass below the plate 5 at the end of the slot in track A and moreover they can depress if necessary when a receptacle is pulled from the truck on to the track A.

At the same time as receptacle e is being moved to the right the receptacle d is being carried intermittently but fairly quickly to the right by a conveyor piece 39 of the conveyor 40. During this movement the lugs 200 of this receptacle pass over the ramps 60 and 61 which are depressed against the influence of their spring supports 187, Figure 17, and eventually the leading end of said receptacle abuts the fixed ramp 58, see Figure 28, and is turned slightly askew, until its leading lug 200 disengages from conveyor piece 39 and just afterward is engaged by an oncoming conveyor piece 38 of the conveyor 32 and the receptacle begins to reverse. The lugs 200 then strike against the edges of the ramps 60 and 61 and as said edges are vertical the ramps do not depress but assisted by the fixed ramp 59 guide the receptacle into track C where it comes in just behind the receptacle a already on that track and still moving past the filling station.

The push plate 62 operates at about the time receptacle d is beginning to move behind receptacle a and pushes the rear end of d more into line with track C so as to avoid contact with a pusher piece 39 of the conveyor 40 which is of course moving in the opposite direction to the present movement of receptacle d.

In order to facilitate the movement of receptacles back on to the trucks the guides 122 may be flared to provide a lead for the end of the receptacles. While only a single truck has been mentioned in the description of the operation it will be apparent that several may be coupled to form a train in view of the location of the guides 123 and studs 121.

At times, for example at the end of a day's run, it may be necessary to remove an incompletely filled truck from the cigarette machine and a device for facilitating this is shown in Figure 19. The member 181 is provided with a further arm 189 and a cam 190 mounted in a cover plate 191 of the apparatus is rotated by a knob 192 to depress the arm 189 and raise the abutments 184 out of the path of the studs 121. Any receptacles extending across from the truck to platform 4 may be pushed across manually and then the truck can be pulled clear of the machine by moving it in the direction of arrow D, Figure 27. The manual movement of the said extending receptacles may be effected by rotation of the handwheel 23 which moves all the parts in the same direction as they move during automatic working.

What I claim as my invention and desire to secure by Letters Patent is:

Apparatus for automatically collecting cigarettes as they issue from a cigarette making machine comprising a truck adapted to carry receptacles of oblong rectangular shape in plan side by side thereon and to move past a cigarette machine, mechanism for withdrawing a receptacle lengthwise from the truck onto a first conveyor system, a second conveyor system moving in the same direction as the first, pushing devices for displacing said receptacle transversely to its length while maintaining substantially the same orientation to bring it into line with said second conveyor system, a third conveyor system moving in the opposite direction to the first and second conveyor systems, devices for displacing said receptacle transversely to its length while maintaining substantially the same orientation to bring it into line with said third conveyor system, said receptacle being carried by said third conveyor system into abutting relationship with a preceding receptacle and in a rectilinear path past a filling position toward and onto said truck.

DESMOND WALTER MOLINS.

REFERENCES CITED

The following references are of record in the file of this patent:

UNITED STATES PATENTS

| Number | Name | Date |
|---|---|---|
| 1,348,341 | Winkley | Aug. 3, 1920 |
| 1,418,203 | Pennock | May 30, 1922 |
| 1,594,465 | Miller, Sr. | Aug. 3, 1926 |
| 1,750,018 | Meyer-Jagenberg | Mar. 11, 1930 |
| 1,751,487 | McIntyre | Mar. 25, 1930 |